(12) United States Patent
Girard et al.

(10) Patent No.: US 8,071,038 B2
(45) Date of Patent: Dec. 6, 2011

(54) PROGRESSIVE CATALYST LOADING FOR INTEGRATED PARTICULATE FILTER AND SELECTIVE CATALYTIC REDUCTION UNIT

(75) Inventors: James W. Girard, Vienna (AT); Giovanni Cavataio, Dearborn, MI (US); Jeong Yeol Kim, Troy, MI (US); Christine Kay Lambert, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/796,720

(22) Filed: Jun. 9, 2010

(65) Prior Publication Data

US 2011/0162346 A1  Jul. 7, 2011

(51) Int. Cl.
*B01D 50/00* (2006.01)
*F01N 3/10* (2006.01)

(52) U.S. Cl. ............ 422/177; 422/180; 60/286; 60/289; 60/297; 60/299

(58) Field of Classification Search .................. 422/171, 422/177, 180; 60/297, 299, 286, 289; 423/239.1
See application file for complete search history.

(56) References Cited

U.S. PATENT DOCUMENTS

| | | | |
|---|---|---|---|
| 6,928,806 B2 * | 8/2005 | Tennison et al. ................ | 60/286 |
| 7,094,728 B2 | 8/2006 | Yan et al. | |
| 7,189,375 B2 | 3/2007 | Molinier et al. | |
| 7,266,943 B2 | 9/2007 | Kammel | |
| 7,763,222 B2 * | 7/2010 | Miyairi et al. ............. | 423/239.1 |
| 7,779,624 B2 * | 8/2010 | Belisle et al. .................. | 60/299 |
| 2007/0107395 A1 | 5/2007 | Zuberi et al. | |
| 2007/0128088 A1 | 6/2007 | Willey et al. | |
| 2007/0137184 A1 | 6/2007 | Patchett et al. | |
| 2008/0072551 A1 | 3/2008 | Zuberi | |
| 2008/0132405 A1 | 6/2008 | Patchett et al. | |
| 2009/0035195 A1 * | 2/2009 | Robel ........................... | 422/177 |
| 2009/0155151 A1 * | 6/2009 | Liu et al. .................... | 423/239.1 |
| 2009/0173063 A1 * | 7/2009 | Boorse et al. ................... | 60/299 |
| 2009/0193796 A1 * | 8/2009 | Wei et al. ........................ | 60/297 |
| 2010/0050598 A1 * | 3/2010 | Plati et al. ....................... | 60/274 |
| 2010/0269491 A1 * | 10/2010 | Boorse et al. ................... | 60/295 |

FOREIGN PATENT DOCUMENTS

WO  2008002907 A2  1/2008

OTHER PUBLICATIONS

SAE International, "A New Metallic Catalyst", Published Mar. 4, 2002, http://papers.sae.org/2002-01-0357, p. 1 of 1.

* cited by examiner

*Primary Examiner* — Nina Bhat
(74) *Attorney, Agent, or Firm* — Damian Porcari; Brooks Kushman P.C.

(57) ABSTRACT

The present invention relates to an emission control system for reducing gases from the exhaust of a combustion engine. In at least one embodiment, the emission control system includes an exhaust passage for transporting the exhaust from the combustion engine, and a particulate filter and selective catalytic reduction (SCR/PF) unit disposed within the passage, with the unit having a plurality of spaced filter walls extending axially along the passage and selective catalytic reduction catalyst variably loaded on the unit to provide a more uniform pressure drop relative to a unit having uniformly loaded catalyst.

20 Claims, 3 Drawing Sheets

PROGRESSIVE CATALYST LOADING FOR INTEGRATED PARTICULATE FILTER AND SELECTIVE CATALYTIC REDUCTION UNIT

BACKGROUND

1. Technical Field

One or more of the embodiments of the present invention relate to an emission control system for removal of regulated combustion components from the exhaust of a combustion process, such as an internal combustion engine.

2. Background Art

Exhaust from a combustion engine typically contains a variety of combustion components or gases such as unburned hydrocarbon (HC), carbon monoxide (CO), particulate matter (PM), nitric oxide (NO), and nitrogen dioxide ($NO_2$), with NO and $NO_2$, collectively referred to as nitrogen oxide or $NO_x$.

Conventional emission control systems often use separate devices for the reduction of $NO_x$ or particulate matter. For example, in one conventional such system, a singular SCR (selective catalytic reduction) catalyst is used for converting $NO_x$ to nitrogen ($N_2$) and a singular particulate filter (PF) is used for removing particulate matter. In this situation, the singular SCR catalyst and the singular particulate filter can be sequentially aligned and disposed separable from each other.

In at least situations where space conservation may be a consideration, a combined singular SCR catalyst on a particulate filter unit (SCR/PF) has been explored. In these instances, the pore size of the particulate filter is generally increased and the SCR washcoat is applied onto the filter and into the pores. One problem that has been observed with SCR/PFs is that the backpressure of the filter unit significantly increases as a result of the SCR material disposed in the filter pores. Also, since the SCR/PF is wall-flow technology, the gas passes through the SCR/PF in a non-uniform manner, with the majority of the gas typically flowing through axial center of the filter substrate. This contributes to the high pressure drop observed with SCR/PF use (since much of the gas is going through a relatively small portion of the filter) and decreases the overall effectiveness of the SCR for NOx reduction (since a relatively small percentage of the SCR material is being exposed to the exhaust gas).

There is thus a continuing need to provide an emission control system with a relatively small space consumption and/or a relatively high $NO_x$ reduction efficiency while minimizing system complexity.

SUMMARY

According to at least one aspect of the invention, an emission control system for reducing gases from the exhaust of a combustion engine is provided. In at least one embodiment, the emission control system includes an exhaust passage for transporting the exhaust from an engine, and a particulate filter and selective catalytic reduction (SCR/PF) unit disposed within the passage, the unit having a plurality of spaced filter walls extending axially along the passage and selective catalytic reduction catalyst variably loaded on the unit to provide a more uniform pressure drop relative to a unit having uniformly loaded catalyst. In at least this embodiment, the catalyst loading is greater at the axial end of the unit than at the axial center of the unit and/or at the radial center of the unit than at the radial end of the unit. In some embodiments, the catalyst is disposed on some of the filter walls and all or less than all of these walls can have a variable catalyst loading.

In at least one embodiment, the plurality of filter walls comprise a plurality of axially varied filter walls, with the axially varied filter walls having an axially variable catalyst loading.

In one embodiment, the catalyst loading at the axial center of the unit is less than the catalyst loading at least one of the axial ends of the unit. In at least another embodiment, the catalyst loading at the axial center of the axially varied filter walls is less than the catalyst loading at least one of the axial ends of the axially varied filter walls.

In one embodiment, the unit has a catalyst loading that progressively decreases as it extends form the axial ends of the catalyst wall towards the axial center. In at least yet another embodiment, at least one of the axially varied catalyst walls has a catalyst loading that progressively decreases as it extends from the axial ends of the catalyst wall towards the axial center.

In one embodiment, the unit has a catalyst loading that stepwise decreases as it extends from the axial ends of the unit towards the axial center of the unit. In at least yet another embodiment, at least one of the axially varied catalyst walls has a catalyst loading that stepwise decreases as it extends from the axial ends of the catalyst wall towards the axial center.

In one embodiment, the unit has a catalyst loading that alternatively increases and decreases as it extends from the axial ends of the unit toward the axial center.

In at least yet another embodiment, the catalyst loading is greater at the radial center of the unit than at the radial end of the unit. In at least this embodiment, the plurality of filter walls comprises a plurality of radially inward walls and a plurality of radially outward walls, with the radially outward walls having an average catalyst loading concentration that is less than the average catalyst loading concentration of the radially inward walls.

According to at least another aspect of the present invention, a particulate filter and selective catalytic reduction (SCR/PF) unit for reducing gases from an exhaust of a combination engine is provided. In at least one embodiment, the unit includes a plurality of spaced filter walls extending axially along a longitudinal axis, and selective catalytic reduction catalyst disposed on at least some of the filter walls, with the catalyst being variably loaded on at least some of the walls of the unit to provide a more uniform pressure drop relative to a unit having uniformly loaded catalyst.

According to at least yet another aspect of the present invention, a method is provided for reducing gases from the exhaust of an internal combustion engine. In at least one embodiment, the method includes providing a SCR/PF comprising a plurality of spaced filter walls extending axially along a longitudinal axis and selective catalytic reduction catalyst disposed on at least some of the filter walls, such that the catalyst is variably loaded on at least some of the walls of the unit to provide a more uniform pressure drop relative to a unit having uniformly loaded catalyst, and contacting the exhaust with the SCR/PF to form a treated exhaust.

DETAILED DESCRIPTION OF THE PREFERRED EMBODIMENT(S)

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in the description and in the claims are to be understood as modified by the word "about" in describing the broader scope of this invention. Practice within the numerical limits stated is generally preferred. Also, unless expressly stated to the contrary, the description of a group or class of material as suitable or preferred for a given purpose in connection with the invention implies that mixtures of any two or more members of the group or class may be equally suitable or preferred.

As used herein and unless otherwise noted, the term "PM filter" or "PF" is interchangeably used to refer to the particulate filter employed to remove particulate matter or the like.

The present invention is capable of reducing gases from the exhaust of a combustion process, such as for instance an internal combustion engine such as a diesel engine or a gasoline engine.

With respect to the Figures that will be described in detail below, like numerals are used to designate like structures throughout the Figures. An emission control system in accordance with at least one embodiment of the present invention is generally shown at 10 in FIG. 1. The emission control system 10 includes an exhaust passage 20 and an integrated particulate filter and SCR (SCR/PF) unit 22.

Figure 1:
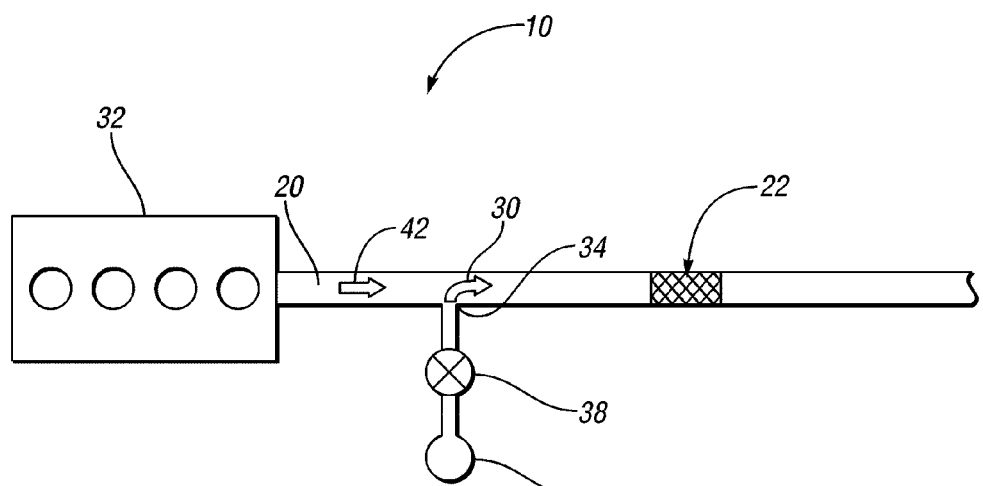
FIG. 1 schematically depicts an exemplary configuration of an emission control system according to an embodiment of the present invention.

In the embodiment illustrated in FIG. 1, a reductant 30 is releasable within the exhaust passage 20 downstream of an engine 32. An opening 34 is optionally located on the exhaust passage 20 and disposed between the engine 32 and the SCR/PF 22 to facilitate the introduction of the reductant 30 into the exhaust passage 20. The reductant 30, capable of reducing $NO_x$ to nitrogen $N_2$, is injected into the exhaust passage 20 optionally through a nozzle (not shown). The injection of the reductant 30 is optionally achieved through the use of a valve 38 which can be employed to meter needed amounts of the reductant 30 from reductant source 40 into the exhaust. The exhaust 42 with the reductant 30 is then conveyed further downstream to the integrated SCR/PF 22 for the reduction of $NO_x$ and particulate matter.

The reductant 30 may be any material suitable for reducing $NO_x$ to a harmless, releasable substance such as nitrogen $N_2$. Exemplary reducing agents are hydrocarbon (HC), ammonia ($NH_3$), an ammonia precursor such as liquid urea, or any combination thereof. As is known, when exposed to a warm or hot exhaust, urea readily decomposes to ammonia. In certain embodiments, a molar ratio of $NH_3/NO_x$ is typically kept at a value predesignated so as to inhibit excess $NH_3$ from slipping past the catalysts and out into the air. An exemplary molar ratio of $NH_3/NO_x$ is at or near one (1).

Decomposition of urea and subsequent reduction of $NO_x$ typically occurs according to the following scheme:

Urea decomposition:

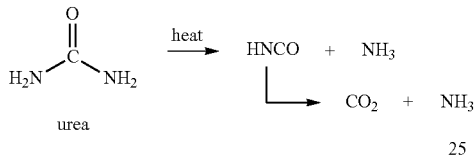

$NO_x$ reduction:

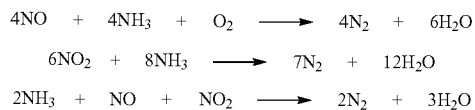

Suitable SCR catalyst compositions for the SCR/PF 22 are able to effectively catalyze the reduction of $NO_x$. In at least one embodiment, the SCR catalysts are capable of converting at least 50% of $NO_x$ to nitrogen ($N_2$), depending on the amount of the reductant 30 supplied. Useful SCR catalysts should also have thermal resistance to temperatures greater than 800 degree Celsius so that the SCR catalysts remain structurally integral throughout an exhaust treatment process.

As used herein and unless otherwise identified, a SCR catalyst is "catalytically functional" in a given temperature when at that temperature, the SCR catalyst is able to convert 50 percent or more by volume of $NO_x$ to nitrogen.

Figure 3:
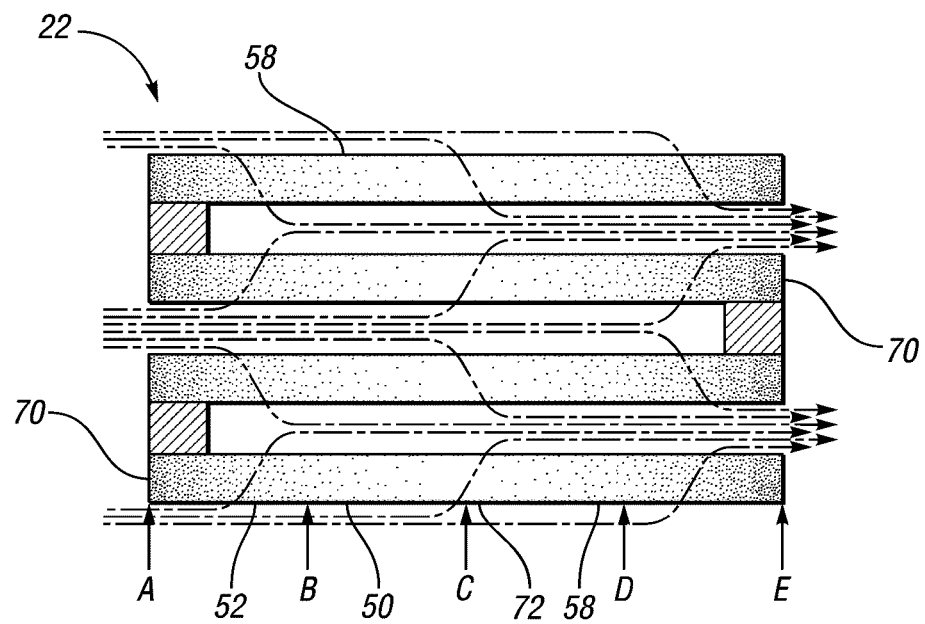
FIG. 3 schematically depicts a portion of the component depicted in FIG. 2 in accordance with one embodiment.
Figure 4:
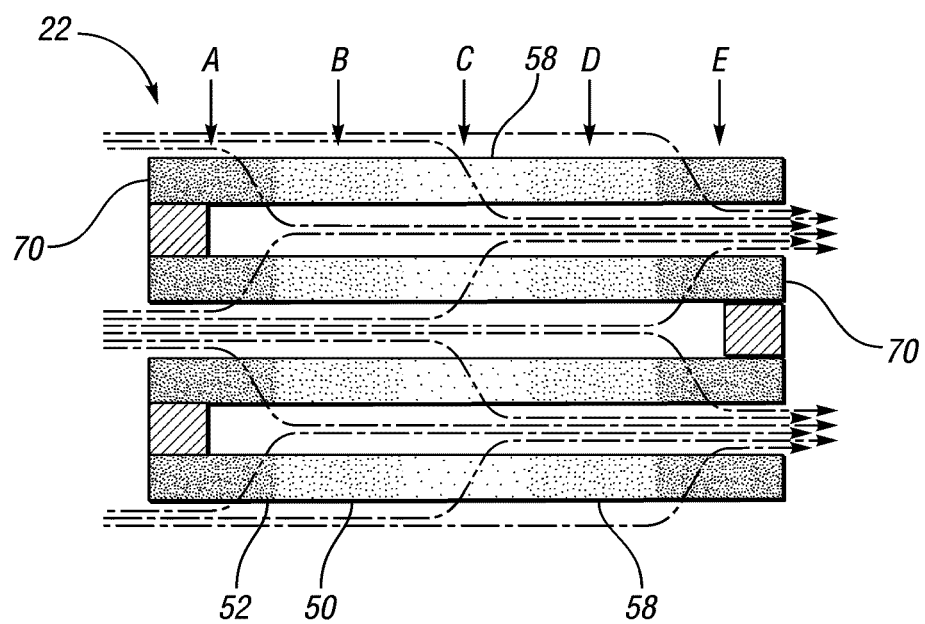
FIG. 4 is similar to FIG. 3 and illustrates another embodiment.
Figure 5:
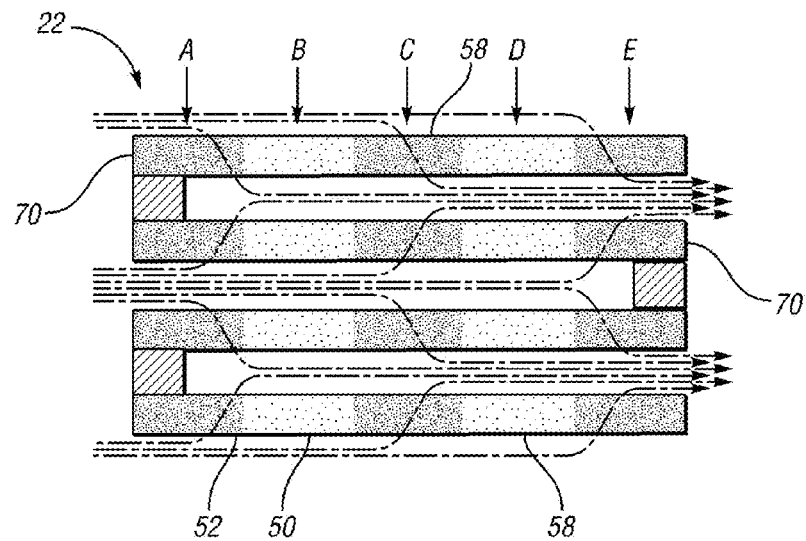
FIG. 5 is similar to FIG. 4 and illustrates yet another embodiment.

As best seen in FIGS. 3-5, the SCR/PF 22 is a particulate filter 50 having SCR catalyst 52 disposed thereon. In at least certain embodiments, the particulate filter 50 is a diesel particulate filter.

Figure 2:
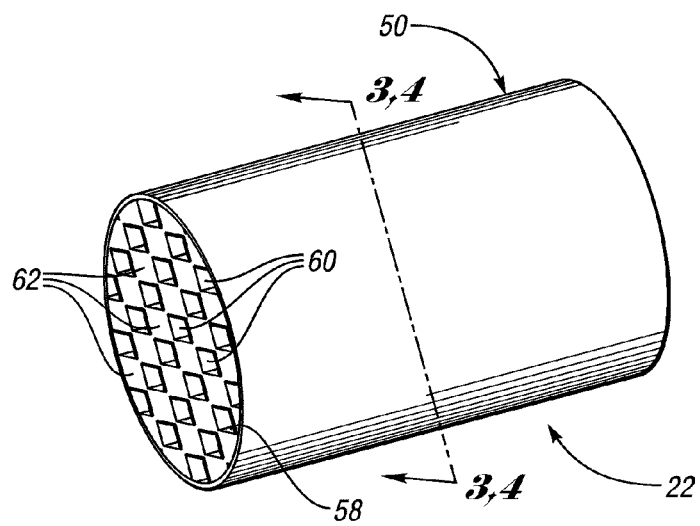
FIG. 2 schematically depicts an exemplary component of the system depicted in FIG. 1.

In at least one embodiment, the SCR catalyst 52 is supported on a wall-flow particulate filter 50 having a plurality of substantially parallel tubes or filter walls 58 defining channels 60 extending along the longitudinal axis of the particulate filter. As shown schematically in FIG. 2, typically, each tube or channel 60 is blocked at one end of the particulate filter with a plug 62 or other blocking device, with alternate passages similarly blocked at opposite ends.

Such particulate filters contain up to 700 or more parallel flow tubes per square inch of cross section, although 700 or less may also be used. An exemplary wall-flow particulate filter is composed of ceramic-like materials such as cordierite, α-alumina, silicon carbide, silicon nitride, zirconia, mullite, spodumene, alumina-silica-magnesia, aluminum titanate or zirconium silicate. The pore sizes and level of porosity are selected to allow flow exchange through the pores while ensuring that all back pressure on the particulate filter to be at a minimum. When made of ceramic material, the particulate filter in at least certain embodiments is constructed to have a porosity of from 35 to 85 percent by volume and to have a mean pore size from 5 to 30 microns. In other embodiments, exemplary filters 50 have a porosity of from 35 to 85 percent by volume and to have a mean pore size from 5 to 30 microns.

In at least one embodiment, the particulate filter with the above-mentioned porosity is further processed to have the SCR catalyst coated thereon. One exemplary method of such a coating is illustrated in U.S. Pat. No. 7,229,597 to Patchett et al., the entire contents of which are incorporated herein by reference. In essence, the particulate filter with a desired porosity is immersed in a catalyst slurry which is then allowed to dry under compressed air. This dipping-drying process may be repeated till the desired level of coating is achieved. After coating, the particulate filter may be dried at a temperature of 100 degrees Celsius and subsequently calcined at a temperature in the range of 300 to 500 degrees Celsius.

In yet at least one embodiment, the SCR catalyst 52 on the particulate filter 50 is catalytically functional in a temperature range of 100 to 800 degrees Celsius.

Any suitable SCR catalyst can be employed. Exemplary suitable SCR catalysts are described in U.S. Pat. No. 4,961,917 to Byrne, the entire content of which is incorporated by reference herein. Some suitable compositions include one or both of an iron and a copper metal atom present in a zeolite in an amount of from 0.1 to 30 percent by weight of the total weight of the metal atoms plus zeolite. Zeolites are resistant to sulfur poisoning and remain active during a SCR catalytic reaction. Zeolites typically have pore sizes large enough to permit adequate movement of $NO_R$, ammonia, and product molecules $N_2$ and $H_2O$. The crystalline structure of zeolites exhibits a complex pore structure having more or less regularly recurring connections, intersections, and the like. By way of example, suitable zeolites are made of crystalline aluminum silicate, with a silica to alumina ratio in the range of 5 to 400 and a mean pore size from 3 to 20 Angstroms.

Suitable SCR catalyst to be used may be a physical mixture of two or more catalysts in any suitable ratio. By way of example, the SCR catalyst 52 of the SCR/PF 22 could be an iron-containing zeolite combined with one or more other metals selected from the group consisting of vanadium, chromium, copper, cerium, molybdenum, tungsten, or any combinations thereof. Similarly, the SCR catalyst of the SCR/PF 22 can be a copper-containing zeolite combined with one or more other metals selected from the group consisting of vanadium, chromium, iron, cerium, molybdenum, tungsten, or any combinations thereof.

The SCR catalyst 52 has a loading concentration defined as an amount in grams of the SCR catalyst 52 per cubic inch of the SCR/PF 22, including exhaust gas flow passages 60 and filter walls 58. It should be understood that the terms catalyst and washcoat, as used by those of ordinary skill in the art, can be and are often used interchangeable. In at least one embodiment, the SCR catalyst 52 has a loading concentration in a range independently selected from no less than 0.2 $g/in^3$, 0.5 $g/in^3$, 1.0 $g/in^3$, 2.0 $g/in^3$, or 3.0 $g/in^3$, to no greater than 7.0 $g/in^3$, 6.0 $g/in^3$, 5.0 $g/in^3$, or 4.0 $g/in^3$ of the filter.

In accordance with various aspects of the disclosure, the catalyst 52 is variably loaded on the filter 50. It has been found that such variable loading helps to provide a relatively uniform pressure drop across the filter 50.

In at least one embodiment, the catalyst 52 has a higher loading at the axial ends 70 of the filter 52 than at its axial center 72, as shown exemplary in FIGS. 3 and 4. In other embodiments, the catalyst 52 has a higher loading at its radial center 84 than at its radial end 82, as shown exemplary in FIG. 6. In still yet other embodiments, the catalyst 52 has a higher loading at the axial ends 70 of the filter 52 than at its axial center 72 and a higher loading at its radial center 84 than at its radial end 82.

As exemplary shown in FIG. 3, the catalyst loading gradually decreases from the ends 70 of the filter 50 towards its center 72. All or less than all of the filter walls 58 of the filter can have an axially varied catalyst loading. In at least one embodiment, exemplary catalyst loadings are at ends A and E of the filter 50 each independently 20-45%, by weight, of the total weight of the catalyst loading, at locations B and D of the filter 50 each independently 10-25%, by weight, of the total weight of the catalyst loading, and at location C of the filter 50 5-15%, by weight, of the total weight of the catalyst loading.

In other embodiments, exemplary catalyst loadings are at ends A and E of the filter 50 each independently 25-35%, by weight, of the total weight of the catalyst loading, at locations B and D of the filter each independently 15-20%, by weight, of the total weight of the catalyst loading, and at location C of the filter 50 8-12%, by weight, of the total weight of the catalyst loading.

In at least one embodiment, locations A, B, C, D and E are spaced roughly 25% of the distance of the filter 50 apart from adjacent locations. For instance, locations A and E are located roughly at the axial ends of the filter 50, location C is located at roughly the mid-point of the filter 50, and locations B and D are located at roughly half-way between locations A and C, and C and E, respectively. In one embodiment, the filter 50 is approximately 8 inches in diameter and 8 inches in length, however the size of the filter 50 may vary as desired.

In at least one embodiment, exemplary catalyst loadings are at ends A and E of the filter 50 each independently 0.7-1.25 $g/in^3$ of the filter, at locations B and D of the filter each independently 0.3-0.6 $g/in^3$ of the filter, and at location C of the filter 0.2-0.4 $g/in^3$ of the filter.

In other embodiments, exemplary catalyst loadings are at ends A and E of the filter 50 each independently 0.8-1.0 $g/in^3$ of the filter, at locations B and D of the filter 50 each independently 0.4-0.5 $g/in^3$ of the filter, and at location C of the filter 50 0.25-0.35 $g/in^3$ of the filter.

As exemplary shown in FIG. 4, the catalyst 52 loading generally stepwise decreases in zones from the ends 70 of the filter 50 towards its center 72. In this embodiment, the zones vary in a gradual manner from most heavily loaded on the outer end zones to the least heavily loaded in the middle zone. All or less than all of the filter walls 58 can have a stepwise decreasing catalyst loading. In at least one embodiment, exemplary catalyst loadings are at zones A and E of the filter 50 each independently 20-45%, by weight, of the total weight of the catalyst loading, at zones B and D of the filter each independently 10-25%, by weight, of the total weight of the catalyst loading, and at zone C of the filter 5-15%, by weight, of the total weight of the catalyst loading.

In other embodiments, exemplary catalyst loadings are at zones A and E of the filter 50 each independently 25-35%, by weight, of the total weight of the catalyst loading, at zones B and D of the filter each independently 15-20%, by weight, of the total weight of the catalyst loading, and at zone C of the filter 8-12%, by weight, of the total weight of the catalyst loading.

In at least one embodiment, exemplary catalyst loadings are at ends A and E of the filter 50 each independently 0.7-1.25 $g/in^3$ of the filter, at zones B and D of the filter each independently 0.3-0.6 $g/in^3$ of the filter, and at zone C of the filter 0.2-0.4 $g/in^3$ of the filter.

In other embodiments, exemplary catalyst loadings are at ends A and E of the filter 50 each independently 0.8-1.0 $g/in^3$ of the filter, at zones B and D of the filter each independently 0.4-0.5 $g/in^3$ of the filter, and at zone C of the filter 0.25-0.35 $g/in^3$ of the filter.

In at least one embodiment, zones A, B, C, D and E are roughly 20% of the distance of the filter 50. For instance, zones A and E extend inward roughly 20% of the length of the filter 50 from the axial ends 70 of the filter, zones B and C extend inwardly roughly 20% of the length of filter 50 from respective inner ends of zones A and E, respectively, towards central zone C, and central zone C extends between zones B and D and is about 20% of the length of the filter 50.

As exemplary shown in FIG. 5, the catalyst 52 loading stepwise varies along locations between the ends 70 of the filter 50. All or less than all of the filter walls 58 can have an alternating catalyst loading. In this embodiment, the zones vary in a generally alternating manner. In at least one embodiment, exemplary catalyst loadings are at zones A, C and E of the filter 50 each independently 20-45%, by weight, of the total weight of the catalyst loading, and at zones B and D of the filter each independently 10-25%, by weight, of the total weight of the catalyst loading.

In other embodiments, exemplary catalyst loadings are at zones A, C and E of the filter 50 each independently 25-35%, by weight, of the total weight of the catalyst loading, and at zones B and D of the filter 50 each independently 15-20%, by weight, of the total weight of the catalyst loading.

In at least one embodiment, exemplary catalyst loadings are at zones A, C, and E of the filter 50 each independently 0.7-1.25 g/in$^3$ of the filter and at zones B and D of the filter each independently 0.3-0.6 g/in$^3$ of the filter.

In other embodiments, exemplary catalyst loadings are at ends A, C, and E of the filter 50 each independently 0.8-1.0 g/in$^3$ of the filter, and at zones B and D of the filter 50 each independently 0.4-0.5 g/in$^3$ of the filter.

Zones A, B, C, D and E are similar in size and shape as those described above with respect to FIG. 4.

Figure 6:
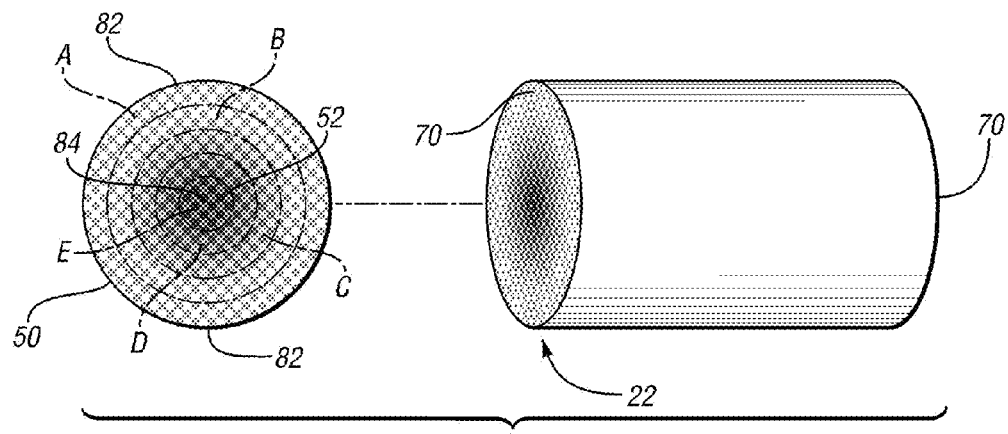
FIG. 6 is similar to FIG. 5 and illustrates still yet another embodiment.

As exemplary shown in FIG. 6, the catalyst 52 loading generally increases from the radial end 82 of the filter 50 towards its radial center 84. In other words, the radially outer walls will generally have a higher catalyst loading than the radially inward walls. In at least one embodiment, exemplary catalyst loadings are at zone E of the filter 50 20-45%, by weight, of the total weight of the catalyst loading, at zone D of the filter 15-40%, by weight, of the total weight of the catalyst loading, at zone C of the filter 10-35%, by weight, of the total weight of the catalyst loading, at zone B of the filter 5-30%, by weight, of the total weight of the catalyst loading, and at zone A of the filter 1-20%, by weight, of the total weight of the catalyst loading.

In other embodiments, exemplary catalyst loadings are at zone E of the filter 50 25-40%, by weight, of the total weight of the catalyst loading, at zone D of the filter 20-35%, by weight, of the total weight of the catalyst loading, at zone C of the filter 15-30%, by weight, of the total weight of the catalyst loading, at zone B of the filter 10-25%, by weight, of the total weight of the catalyst loading, and at zone A of the filter 5-15%, by weight, of the total weight of the catalyst loading.

In one embodiment, exemplary catalyst loadings are at zone E of the filter 50 1.0-1.25 g/in$^3$ of the filter, at zone D of the filter 0.8-0.99 g/in$^3$ of the filter, at zone C of the filter 0.6-0.79 g/in$^3$ of the filter, at zone B of the filter 0.3-0.59 g/in$^3$ of the filter, and at zone A of the filter 0.1-0.29 g/in$^3$ of the filter.

In other embodiments, exemplary catalyst loadings are at zone E of the filter 50 1.05-1.15 g/in$^3$ of the filter, at zone D of the filter 0.85-0.95 g/in$^3$ of the filter, at zone C of the filter 0.55-0.70 g/in$^3$ of the filter, at zone B of the filter 0.35-0.50 g/in$^3$ of the filter, and at zone A of the filter 0.15-0.20 g/in$^3$ of the filter.

In at least one embodiment, zones A, B, C, D and E are each roughly 20% of the volume of the filter 50, however these zones can vary as desired.

While the filters 50 have been described above as having exemplary locations and zones A-E, it should be understood that in practice, the number of locations and/or zones can vary as desired. For instance, they can be more or less than 5. Moreover, other embodiments can be envisioned. For instance, in certain embodiments, the catalyst 52 has a higher loading at the axial ends 70 of the filter 52 than at its axial center 72 and a higher loading at its radial center 84 than at its radial end 82.

It has further been found that, the SCR/PF 22 contemplated herein provides a lower pressure drop. While not intended to be limited to any particularly theory, the synergistic efficiency effect may be explained by creating additional flow paths and/or a more distributed gas flow within the SCR/PF 22. As such, the resulting $NO_2/NO$ is better suited for a downstream catalytic conversion by the SCR/PF catalyst 52.

In at least one embodiment, the particulate filter 52 of FIGS. 3-6 are further processed to have the SCR catalyst coated thereon. In this embodiment, the particulate filter 50 with a desired porosity is immersed in a catalyst slurry which is then allowed to dry under compressed air. This dipping-drying process is then repeated till the desired level of coating is achieved. Various masking, varying exposure times, and/or varying washcoat solutions weight percent, among other things, could be employed to create varying zones and/or graduated coatings on the filter 50. Alternatively, spray coating could also be used. After coating, the particulate filter may be dried at a temperature of 100 degrees Celsius and subsequently calcined at a temperature in the range of 300 to 500 degrees Celsius.

In at least one embodiment, an oxidation catalyst (not shown) can be disposed within the exhaust passage 20 between the engine 112 and the opening 34. Oxidation catalysts that contain platinum group metals, base metals and combinations thereof are known to facilitate the treatment of engine exhaust by promoting the conversion of both HC and CO gaseous pollutants and at least some portion of the particulate matter through oxidation of these pollutants to carbon dioxide and water. The oxidation catalyst generally helps to break down pollutants in the exhaust to less harmful components. In particular, the oxidation catalyst utilizes palladium and platinum catalysts to mainly help reduce the unburned hydrocarbon and carbon monoxide according to the following reaction formula: $CO+O2 \longrightarrow CO2$.

When an oxidation catalyst is used, an exhaust containing unburned hydrocarbons (HC), carbon monoxide (CO), nitrogen oxide ($NO_x$), and particulate matter (PM) is emitted from the engine 32 through exhaust passage 20 to the oxidation catalyst. In the oxidation catalyst, unburned hydrocarbon and carbon monoxide are combusted to form carbon dioxide and water. Removal of the HC and CO using the oxidation catalyst helps to relieve some burden on the downstream SCR/PF 22 in remediating the exhaust.

In addition, the oxidation catalyst also converts a certain portion of the nitric oxide NO to nitrogen dioxide $NO_2$ so that the $NO/NO_2$ ratio is more suitable for downstream SCR catalytic reactions. An increased proportion of $NO_2$ in the $NO_x$, due to the catalytic action of the upstream oxidation catalyst, facilitates the reduction of $NO_x$ as compared to exhaust streams containing smaller proportions of $NO_2$ in the $NO_x$ component. Furthermore, the oxidation catalyst helps to regenerate particulate filter 50 for continuous engine operation. During diesel engine operation, soot typically will accumulate on the particulate filter 50 over time and cause back pressure elevation which diminishes the full operating efficiency of the engine. One solution is to generate a sufficiently high temperature in the range of about 600 to 700 degrees Celsius to induce the combustion of the soot by injecting fuel onto the oxidation catalyst.

The integrated particulate filter SCR 22 may be further altered in its configuration without materially changing its intended function.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An emission control system comprising:
   an exhaust passage for transporting the exhaust from the combustion engine; and
   a particulate filter and selective catalytic reduction (SCR/PF) unit disposed within the passage, the unit having a plurality of spaced filter walls extending axially along the passage and selective catalytic reduction catalyst variably loaded on the unit to provide a more uniform pressure drop relative to a unit having uniformly loaded catalyst, wherein the unit has more catalyst loading at least one of the axial ends of the unit and the unit has a washcoat loading concentration from 0.2 to 0.4 grams per cubic inch of filter at its axial center and a catalyst loading concentration from 0.7 to 1.25 grams per cubic inch of filter at least one of its axial ends.

2. The emission control system of claim 1, wherein the catalyst loading is greater at the axial end of the unit than at the axial center of the unit and/or at the radial center of the unit than at the radial end of the unit.

3. The emission control system of claim 1, wherein the plurality of filter walls comprise a plurality of axially varied filter walls, the axially varied filter walls having an axially variable catalyst loading.

4. The emission control system of claim 1, wherein the unit has a catalyst loading that progressively decreases as it extends from the axial ends of the catalyst wall towards the axial center.

5. The emission control system of claim 1, wherein the unit has a catalyst loading that stepwise decreases as it extends from the axial ends of the unit towards the axial center of the unit.

6. The emission control system of claim 1, wherein the unit has axially end zones having a catalyst loading of 20-45%, by weight, of the total weight of the catalyst loading and an axially inward zone having a catalyst loading of 5-15%, by weight, of the total weight of the catalyst loading.

7. The emission control system of claim 1, wherein the unit has a catalyst loading that alternatively increases and decreases as it extends from the axial ends of the unit towards the axial center.

8. The emission control system of claim 2, wherein the catalyst loading is greater at the radial center of the unit than at the radial end of the unit.

9. The emission control system of claim 8, wherein the plurality of filter walls comprises a plurality of radially inward walls and a plurality of radially outward walls, the radially outward walls an average catalyst loading concentration that is less than the average catalyst loading concentration of the radially inward walls.

10. The emission control system of claim 1, wherein at least one of the radially inward walls has a catalyst loading concentration from 1.0 to 1.25 grams per cubic filter wall and at least one of the radially outward walls has a catalyst loading concentration from 0.3 to 0.59 grams per cubic inch filter wall.

11. A particulate filter and selective catalytic reduction (SCR/PF) unit for reducing gases from an exhaust of a combustion engine, the unit comprising: a plurality of spaced filter walls extending axially along a longitudinal axis; and selective catalytic reduction catalyst disposed on at least some of the filter walls, the catalyst being variably loaded on at least some of the walls of the unit to provide a more uniform pressure drop relative to a unit having uniformly loaded catalyst, the catalyst loading at the axial center of the axially varied filter walls is less than the catalyst loading at least one of the axial ends of the axially varied filter walls, the catalyst loading being in an amount ranging from 0.7 to 1.25 grams per cubic inch of filter wall at least one of its axial ends, wherein at least one of the axially varied catalyst walls has a washcoat loading concentration from 0.2 to 0.4 grams per cubic inch of filter at its axial center.

12. The particular filter and selective catalytic reduction (SCR/PF) unit of claim 11, wherein the catalyst loading is greater at the axial end of the unit than at the axial center of the unit and/or at the radial center of the unit than at the radial end of the unit.

13. The particular filter and selective catalytic reduction (SCR/PF) unit of claim 11, wherein the catalyst loading is greater at the radial center of the unit than at the radial end of the unit.

14. The particular filter and selective catalytic reduction (SCR/PF) unit of claim 11, wherein the unit has axially end zones each having a catalyst loading of 20-45%, by weight, of the total weight of the catalyst loading and an axially inward zone having a catalyst loading of 5-15%, by weight, of the total weight of the catalyst loading.

15. A method for reducing gases from the exhaust of an internal combustion engine, the method comprising:
   providing a SCR/PF comprising a plurality of spaced filter walls extending axially along a longitudinal axis and selective catalytic reduction catalyst disposed on at least some of the filter walls, such that the catalyst is variably loaded on at least some of the walls of the unit to provide a more uniform pressure drop relative to a unit having uniformly loaded catalyst, the catalyst being present in an amount ranging from 0.7 to 1.25 grams per cubic inch of filter at least one of its axial ends; and
   contacting the exhaust with the SCR/PF to form a treated exhaust.

16. The method of claim 15, wherein the catalyst loading is greater at the axial end of the unit than at the axial center of the unit and/or at the radial center of the unit than at the radial end of the unit.

17. The emission control system of claim 1, wherein the catalyst is present in an amount ranging from 0.8 grams per cubic inch of filter to 1.0 gram per cubic inch of filter at least one of its axial ends.

18. The emission control system of claim 1, wherein less than all of the filter walls have the axially varied catalyst loading.

19. The emission control system of claim 1, wherein the unit has axially end zones having a catalyst loading ranging from 25 to 35 percent by weight of the total weight of the catalyst loading.

20. The emission control system of claim 1, wherein the SCR/PF has a plurality of zones of catalyst loading, the zones varying in an alternating configuration with regard to catalyst loading in at least a portion of the filter walls.

* * * * *